(12) United States Patent
Billington et al.

(10) Patent No.: US 10,747,321 B2
(45) Date of Patent: Aug. 18, 2020

(54) SYSTEMS AND METHODS FOR DIFFERENTIAL OPTICAL POSITION SENSING FOR HAPTIC ACTUATION

(71) Applicant: Immersion Corporation, San Jose, CA (US)

(72) Inventors: Doug Billington, Campbell, CA (US); Van H. Tran, San Jose, CA (US); Kaniyalal Shah, Fremont, CA (US); Danny A. Grant, Laval (CA); Juan Manuel Cruz-Hernandez, Montreal (CA)

(73) Assignee: Immersion Corporation, San Francisco, CA (US)

( * ) Notice: Subject to any disclaimer, the term of this patent is extended or adjusted under 35 U.S.C. 154(b) by 6 days.

(21) Appl. No.: 16/010,258

(22) Filed: Jun. 15, 2018

(65) Prior Publication Data

US 2019/0384398 A1     Dec. 19, 2019

(51) Int. Cl.
*G06F 3/01*      (2006.01)
*G06F 3/042*     (2006.01)

(52) U.S. Cl.
CPC .............. *G06F 3/016* (2013.01); *G06F 3/042* (2013.01)

(58) Field of Classification Search
CPC .... G06F 3/0304; G06F 3/03545; H04N 5/144
See application file for complete search history.

(56) References Cited

U.S. PATENT DOCUMENTS

| | | | |
|---|---|---|---|
| 5,072,361 A | 12/1991 | Davis et al. | |
| 5,384,676 A | 1/1995 | Yokoyama et al. | |
| 6,680,729 B1 | 1/2004 | Shahoian et al. | |
| 7,154,470 B2 | 12/2006 | Tierling et al. | |
| 7,209,118 B2 | 4/2007 | Shahoian et al. | |
| 7,218,310 B2 | 5/2007 | Tierling et al. | |
| 7,369,115 B2 | 5/2008 | Cruz-Hernandez et al. | |
| 7,639,232 B2 | 12/2009 | Grant et al. | |
| 7,843,277 B2 | 11/2010 | Gregorio et al. | |
| 8,156,809 B2 | 4/2012 | Tierling et al. | |
| 8,325,144 B1 | 12/2012 | Tierling et al. | |
| 8,378,965 B2 | 2/2013 | Gregorio et al. | |
| 8,610,549 B2 | 12/2013 | Modarres et al. | |
| 8,791,799 B2 | 7/2014 | Lacroix et al. | |

(Continued)

OTHER PUBLICATIONS

U.S. Appl. No. 15/789,323, filed Oct. 20, 2017, Shah, Kaniyalal.
EP 19180338.6, "Extended European Search Report," dated Sep. 17, 2019, 12 pages.

*Primary Examiner* — Gerald Johnson
(74) *Attorney, Agent, or Firm* — Kilpatrick Townsend & Stockton LLP (57) ABSTRACT

Systems and methods for differential optical position sensing for a haptic actuator are disclosed. In one embodiment, a system includes: an actuator configured to receive a drive signal and move an object to output a haptic effect; a first sensor configured to monitor a position of the object and output a first position signal; a second sensor configured to monitor the position of the object and output a second position signal different from the first position signal; a circuit configured to receive the first position signal and the second position signal and output a difference signal; and a processor configured to receive the difference signal and output a control signal to the actuator based on the difference signal.

20 Claims, 5 Drawing Sheets

(56) References Cited

U.S. PATENT DOCUMENTS

| | | |
|---|---|---|
| 9,711,420 B1 | 7/2017 | Lo et al. |
| 2001/0045941 A1 | 11/2001 | Rosenberg et al. |
| 2017/0089735 A1* | 3/2017 | Ruh .......................... G01D 5/30 |
| 2017/0364167 A1* | 12/2017 | Ribeiro ................... G06F 3/016 |

* cited by examiner

SYSTEMS AND METHODS FOR DIFFERENTIAL OPTICAL POSITION SENSING FOR HAPTIC ACTUATION

FIELD OF THE INVENTION

The present invention generally relates to haptic feedback and more particularly to systems and methods for differential optical position sensing for a haptic actuator.

BACKGROUND

Haptic-enabled devices have become increasingly popular as are haptic-enabled environments. For instance, mobile and other devices may be configured with touch-sensitive surfaces so that a user can provide input by touching portions of the touch-sensitive display. As more haptic-enabled environments are being used, a desire for sharp haptic feedback has emerged. However, in order to achieve this sharp haptic feedback, an expensive actuator and additional control system must be used. There is therefore a need for cheaper and more efficient actuator systems for providing sharp haptic feedback.

SUMMARY

In one embodiment, a system of the present disclosure may comprise: an actuator configured to receive a drive signal and move an object to output a haptic effect; a first sensor configured to monitor a position of the object and output a first position signal; a second sensor configured to monitor the position of the object and output a second position signal different from the first position signal; a circuit configured to receive the first position signal and the second position signal and output a difference signal; and a processor configured to receive the difference signal and output a control signal to the actuator based on the difference signal.

Another embodiment of the present disclosure may comprise: outputting a drive signal to an actuator coupled to an object and configured to move the object to output a haptic effect; receiving a first position signal from a first sensor configured to monitor a position of the object; receiving a second position signal from a second sensor configured to monitor the position of the object the second position signal different from the first position signal; outputting a difference signal; and determining a control signal to the actuator based on the difference signal.

In yet another embodiment, a non-transitory computer readable medium may comprise program code, which when executed by a processor is configured to cause the processor to: output a drive signal to an actuator coupled to an object and configured to move the object to output a haptic effect; receive a difference signal from a difference circuit configured to: receive a first position signal from a first sensor configured to monitor the position of the object; receive a second position signal from a second sensor configured to monitor the position of the object, the second position signal different from the first position signal; and output a control signal to the actuator based on the difference signal.

BRIEF DESCRIPTION OF THE DRAWINGS

A full and enabling disclosure is set forth more particularly in the remainder of the specification. The specification makes reference to the following appended figures.

DETAILED DESCRIPTION

Reference will now be made in detail to various and alternative illustrative embodiments and to the accompanying drawings. Each example is provided by way of explanation, and not as a limitation. It will be apparent to those skilled in the art that modifications and variations can be made. For instance, features illustrated or described as part of one embodiment may be used in another embodiment to yield a still further embodiment. Thus, it is intended that this disclosure include modifications and variations as come within the scope of the appended claims and their equivalents.

Illustrative Example of Differential Optical Position Sensing for a Haptic Actuator One illustrative embodiment of the present disclosure comprises a computing system such as a tablet, e-reader, mobile phone, or computer such as a laptop or desktop computer, wearable device, or interface for Virtual Reality (VR) or Augmented Reality (AR). The computing system can include and/or may be in communication with one or more sensors, such as an accelerometer, as well as sensors (e.g., optical, resistive, or capacitive) for determining a location of a touch relative to a display area corresponding in this example to the screen of the device.

The illustrative device comprises a processor configured to determine haptic effects, e.g., vibrations or surface movements that are detectable to the user via touch. The processor transmits a signal associated with these haptic effects to a haptic output device configured to output the haptic effects. In some embodiments, these haptic effects may comprise vibration based effects output by an actuator configured to move an object to generate vibration. The user may experience the vibrations as pops, clicks, variations in texture or friction, or other touch-based effects.

Haptic actuators may be designed to resonate at a specific frequency. In some embodiments these haptic actuators may "ring" after a drive voltage is removed and the actuator decelerates. In some embodiments, the processor may output a braking pulse to cancel the ringing by making the actuator stop faster to create a more "crisp" haptic effect that begins and ends without having long ramp-up and ramp-down periods. In some embodiments, the ringing is a function of the actuator resonant frequency. An illustrative embodiment of the present disclosure solves this problem by using a closed-loop design.

Embodiments of the present disclosure use optical sensors to monitor the position of an object moved by the actuator to output a haptic effect. These sensors then output one or more sensor signals to the processor to enable the processor to modify a drive signal output to the actuator to enhance the haptic effect (e.g., to overdrive the actuator or output a braking pulse) leading to a more crisp haptic effect.

An illustrative embodiment of the present disclosure overcomes the problem of noise associated with sensors (e.g., optical sensors may detect ambient light such as infrared light output by florescent lights). The illustrative embodiment uses two optical sensors, which each monitor the position of an object moved by the actuator. In the illustrative embodiment, a first optical sensor outputs a first position signal and a second optical sensor outputs a second position signal which is different from the first position signal (e.g., the second position signal is inverted, 180 degrees out of phase from the first position signal, and/or one position signal is increasing while the other is decreasing).

The two position signals are then input to a differential circuit (e.g., a differential op-amp circuit). Any ambient noise hits both sensors, and thus is cancelled out by the differential circuit. The differential circuit outputs a difference signal to the processor, which can then use this difference signal to determine the position of the object and control the actuator accordingly to improve the haptic effect. For example, in the illustrative embodiment, the processor may modify one or more of the voltage, current, frequency, duty cycle, or phase of the drive signal based on the detected position of the object to improve the haptic effect. For example, the processor may invert the drive signal or output a drive signal that is 180 degrees out of phase from the original drive signal.

This illustrative example is given to introduce the reader to the general subject matter discussed herein and the disclosure is not limited to this example. The following sections describe various additional non-limiting examples of the present disclosure.

Figure 1:
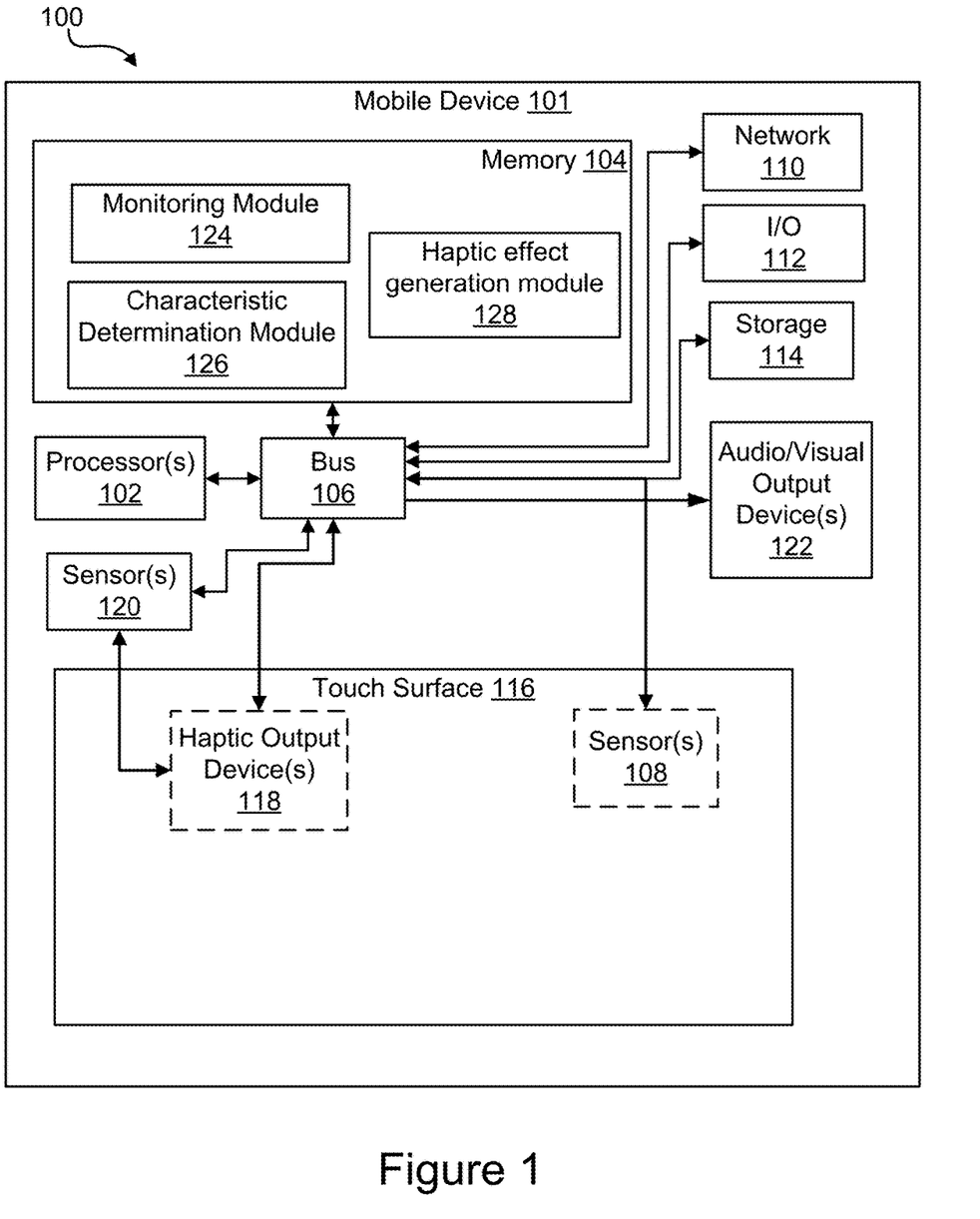
FIG. 1 shows an illustrative system for a differential optical position sensing for a haptic actuator according to one embodiment.

Illustrative Systems for Differential Optical Position Sensing for a Haptic Actuator FIG. 1 shows an illustrative system 100 for controlling actuator drive for improving transient response characteristics. Particularly, in this example, system 100 comprises a mobile device 101 having a processor 102 interfaced with other hardware via bus 106. A memory 104, which can comprise any suitable tangible (and non-transitory) computer-readable medium such as RAM, ROM, EEPROM, or the like, embodies program components that configure operation of the mobile device 101. In this example, mobile device 101 further includes one or more network devices 110, input/output (I/O) interface components 112, and additional storage 114.

Network device 110 can represent one or more of any components that facilitate a network connection. Examples include, but are not limited to, wired interfaces such as Ethernet, USB, IEEE 1394, and/or wireless interfaces such as IEEE 802.11, Bluetooth, or radio interfaces for accessing cellular telephone networks (e.g., transceiver/antenna for accessing a CDMA, GSM, UMTS, or other mobile communications network).

I/O components 112 may be used to facilitate connection to devices such as one or more displays, headsets comprising displays, curved displays (e.g., the display includes angled surfaces extended onto one or more sides of mobile device 101 on which images may be displayed), keyboards, mice, speakers, microphones, cameras (e.g., a front and/or a rear facing camera on a mobile device) and/or other hardware used to input data or output data. Storage 114 represents nonvolatile storage such as magnetic, optical, or other storage media included in mobile device 101.

Audio/visual output device(s) 122 comprise one or more devices configured to receive signals from processor(s) 102 and provide audio or visual output to the user. For example, in some embodiments, audio/visual output device(s) 122 may comprise a display such as a touch-screen display, LCD display, plasma display, CRT display, projection display, a headset comprising a display for each eye (e.g., for use in mixed reality or virtual reality), or some other display known in the art. Further, audio/visual output devices may comprise one or more speakers configured to output audio to a user.

System 100 further includes a touch surface 116, which, in this example, is integrated into mobile device 101. Touch surface 116 represents any surface that is configured to sense touch input of a user. In some embodiments, touch surface 116 may be configured to detect additional information associated with the touch input, e.g., the pressure, speed of movement, acceleration of movement, temperature of the user's skin, or some other information associated with the touch input. One or more sensors 108 may be configured to detect a touch in a touch area when an object contacts a touch surface and provide appropriate data for use by processor 102. Any suitable number, type, or arrangement of sensors can be used. For example, resistive and/or capacitive sensors may be embedded in touch surface 116 and used to determine the location of a touch and other information, such as pressure. As another example, optical sensors with a view of the touch surface may be used to determine the touch position.

Further, in some embodiments, touch surface 116 and/or sensor(s) 108 may comprise a sensor that detects user interaction without relying on a touch sensor. For example, in one embodiment, the sensor may comprise a sensor configured to use electromyography (EMG) signals to detect pressure applied by a user on a surface. Further, in some embodiments, the sensor may comprise RGB or thermal cameras and use images captured by these cameras to estimate an amount of pressure the user is exerting on a surface.

In some embodiments, sensor 108 and touch surface 116 may comprise a touch-screen display or a touch-pad. For example, in some embodiments, touch surface 116 and sensor 108 may comprise a touch-screen mounted overtop of a display configured to receive a display signal and output an image to the user. In other embodiments, the sensor 108 may comprise an LED detector. For example, in one embodiment, touch surface 116 may comprise an LED finger detector mounted on the side of a display. In some embodiments, the processor is in communication with a single sensor 108, in other embodiments, the processor is in communication with a plurality of sensors 108, for example, a first touch screen and a second touch screen.

In some embodiments one or more sensor(s) 108 further comprise one or more sensors configured to detect movement of the mobile device (e.g., accelerometers, gyroscopes, cameras, GPS, or other sensors). These sensors may be configured to detect user interaction that moves the device in the X, Y, or Z plane. The sensor 108 is configured to detect user interaction, and based on the user interaction, transmit signals to processor 102. In some embodiments, sensor 108 may be configured to detect multiple aspects of the user interaction. For example, sensor 108 may detect the speed and pressure of a user interaction, and incorporate this information into the interface signal. Further, in some embodiments, the user interaction comprises a multi-dimensional user interaction away from the device. For example, in some embodiments a camera associated with the device may be configured to detect user movements, e.g., hand, finger, body, head, eye, or feet motions or interactions with another person or object.

In this example, a haptic output device 118 in communication with processor 102 is coupled to touch surface 116. In some embodiments, haptic output device 118 is configured, in response to a haptic signal, to output a haptic effect associated with the touch surface 116. Additionally or alternatively, haptic output device 118 may provide vibrotactile haptic effects that move the touch surface in a controlled manner. Some haptic effects may utilize an actuator coupled to a housing of the device, and some haptic effects may use multiple actuators in sequence and/or in concert. For example, in some embodiments, a surface texture may be simulated by vibrating the surface at different frequencies. In such an embodiment haptic output device 118 may comprise one or more of, for example, a linear resonant actuator (LRA), a piezoelectric actuator, an eccentric rotating mass motor (ERM), an electric motor, an electro-magnetic actuator, a voice coil, a shape memory alloy, an electro-active polymer, or a solenoid. In some embodiments, haptic output device 118 may comprise a plurality of actuators, for example an ERM and an LRA.

In some embodiments, the haptic effect may be modulated based on other sensed information about user interaction, e.g., relative position of hands in a virtual environment, object position in a VR/AR environment, object deformation, relative object interaction in a GUI, UI, AR, VR, etc. In still other embodiments, methods to create the haptic effects include the variation of an effect of short duration where the magnitude of the effect varies as a function of a sensed signal value (e.g., a signal value associated with user interaction). In some embodiments, when the frequency of the effect can be varied, a fixed perceived magnitude can be selected and the frequency of the effect can be varied as a function of the sensed signal value.

Although a single haptic output device 118 is shown here, embodiments may use multiple haptic output devices of the same or different type to output haptic effects. For example, in one embodiment, a piezoelectric actuator may be used to displace some or all of touch surface 116 vertically and/or horizontally at ultrasonic frequencies, such as by using an actuator moving at frequencies greater than 20-25 kHz in some embodiments. In some embodiments, multiple actuators such as eccentric rotating mass motors and linear resonant actuators can be used alone or in concert to provide different textures and other haptic effects.

Mobile device 101 may also comprise one or more of sensors 120. Sensors 120 may be coupled to processor 102 and used to monitor positions of the haptic output device 118 or a mass moved by the haptic output device 118 to output a haptic effect. In some embodiments, sensors 120 may comprise optical sensors, magnetic field sensors, audio based sensors, or sensors configured to detect a Doppler shift. In some embodiments two sensors 120 may detect the position of the haptic output device 118 or a mass moved by the haptic output device 118. For example, a first sensor outputs a first position signal and a second sensor outputs a second position signal. In some embodiments, the second sensor signal is different from the first position signal (e.g., the second position signal is inverted, 180 degrees out of phase from the first position signal, and/or one position signal is increasing while the other is decreasing).

The two position signals are then input to a differential circuit (e.g., a differential op-amp circuit). Ambient noise impacts (e.g., outside light sources) both sensors, and thus is cancelled out by the differential circuit. The differential circuit may cancel other types of noise as well, e.g., noise from the power supply or RF noise from nearby electronic devices. The differential circuit outputs a difference signal to the processor 102, which can then use this difference signal to determine the position of the object and control the haptic output device 118 accordingly to improve the haptic effect. For example, in the illustrative embodiment, the processor 102 may modify one or more of the voltage, current, frequency, duty cycle, or phase of the drive signal output to the haptic output device 118 based on the detected position of the object to improve the haptic effect.

Turning to memory 104, exemplary program components 124, 126, and 128 are depicted to illustrate how a device may be configured to determine and output haptic effects. In this example, a detection module 124 configures processor 102 to monitor touch surface 116 via sensor 108 to determine a position of a touch. For example, module 124 may sample sensor 108 in order to track the presence or absence of a touch and, if a touch is present, to track one or more of the location, path, velocity, acceleration, pressure, and/or other characteristics of the touch over time.

Haptic effect determination module 126 represents a program component that analyzes data regarding touch characteristics to select a haptic effect to generate. Particularly, module 126 comprises code that determines, based on the location of the touch, a simulated feature to generate on the touch surface. Module 126 may further comprise code that selects one or more haptic effects to provide in order to simulate the feature. For example, some or all of the area of touch surface 116 may be mapped to a graphical user interface. Different haptic effects may be selected based on the location of a touch in order to simulate the presence of the feature by simulating a texture on a surface of touch surface 116 so that the feature is felt when a corresponding representation of the feature is seen in the interface. However, haptic effects may be provided via touch surface 116 even if a corresponding element is not displayed in the interface (e.g., a haptic effect may be provided if a boundary in the interface is crossed, even if the boundary is not displayed).

Haptic effect generation module 128 represents programming that causes processor 102 to generate and transmit a haptic signal to haptic output device 118, which causes haptic output device 118 to generate the selected haptic effect. For example, generation module 128 may access stored waveforms or commands to send to haptic output device 118. As another example, haptic effect generation module 128 may receive a desired type of haptic effect and utilize signal processing algorithms to generate an appropriate signal to send to haptic output device 118. As a further example, a desired haptic effect may be indicated along with target coordinates for the desired haptic effect and an appropriate waveform sent to one or more actuators to generate appropriate displacement of the surface (and/or other device components) to provide the haptic effect. Some embodiments may utilize multiple haptic output devices in concert to simulate a feature. For instance, a variation in texture may be used to simulate crossing a boundary between buttons on an interface while a vibrotactile effect simulates the response when the button is pressed.

System 100 may further implement closed-loop control of haptic effects. For example, in one embodiment, processor 102 may output a haptic signal corresponding to a desired haptic effect to the haptic output device 118. The processor 102 may also receive a reference signal. The reference signal may represent the a sensor signal that would be generated if a haptic output device accurately created a haptic effect. At the same time the processor 102 may receive a sensor signal from sensor 120 corresponding to the haptic effect that is currently output.

The processor 102 may determine an error between the reference signal and the signal received from sensor 120. Based on the error, the processor 102 can determine how to modify the haptic signal to achieve an effect that is more representative of the reference signal. For instance, the processor 102 may increase the gain of the haptic signal to create a stronger effect. Alternatively, the processor 102 might utilize a different type of controller, such as a proportional or proportional integral controller to modify the haptic signal. Further the processor 102 may implement a combination of varying the gain and type of controller is used to modify the haptic signal.

Figure 2:
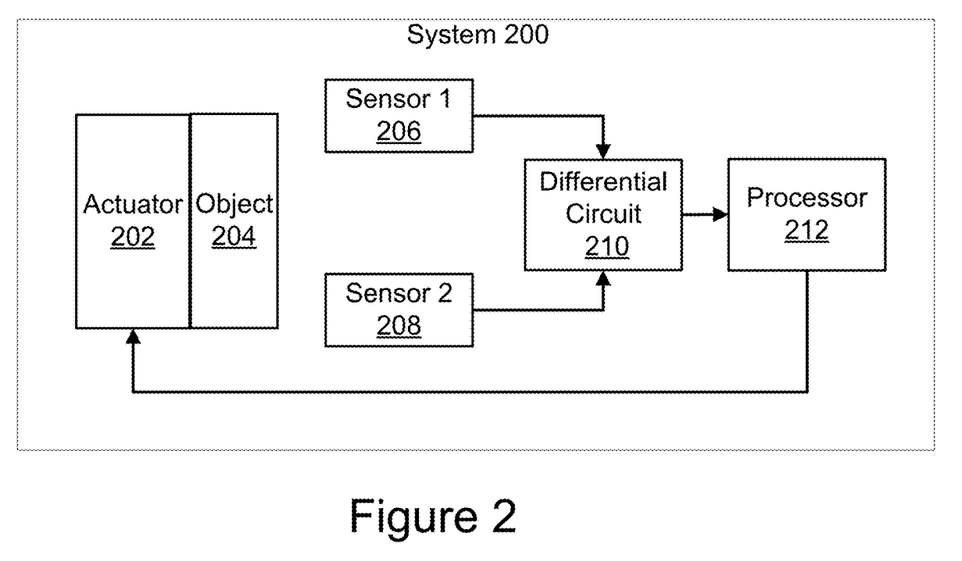
FIG. 2 shows another illustrative system for a differential optical position sensing for a haptic actuator according to one embodiment.

Turning now to FIG. 2, which shows an illustrative system 200 for a differential optical position sensing for a haptic actuator according to one embodiment. The system 200 may comprise a computing system such as a tablet, e-reader, mobile phone, or computer such as a laptop or desktop computer, wearable device, or interface for Virtual Reality (VR) or Augmented Reality (AR). Alternatively, the system 200 may comprise a separate assembly for outputting haptic effects, which is installed in other computing devices to provide haptic functionality.

As is shown in FIG. 2, the system 200 comprises an actuator 202, object 204, two sensors 206 and 208, differential amplifier 210, and processor 212. As shown in FIG. 2, the actuator comprises an electronic device configured to receive a haptic signal from processor 212 and output a haptic effect by moving object 204. For example, actuator 202 may comprise one or more of an LRA, ERM, a piezoelectric actuator, an electric motor, an electro-magnetic actuator, a voice coil, a shape memory alloy, an electro-active polymer, or a solenoid. Actuator 202 is configured to move object 204 to output a haptic effect. In some embodiments, object 204 may comprise a component of actuator 202.

The system 200 further comprises two sensors 206, 208 configured to monitor the position of object 204 and transmit position signals associated with the position of object 204. The sensors 206, 208 may comprise one or more of optical sensors, magnetic field sensors, audio based sensors, or sensors configured to detect a Doppler shift. Further, to cancel ambient noise (e.g., audio, RF, power supply, or light based noise) the two sensors output position signals that are inverted. For example sensor 1 (206) outputs a first position signal and sensor 2 (208) outputs a second position signal is different from the first position signal (e.g., the second position signal is inverted, 180 degrees out of phase from the first position signal, and/or one position signal is increasing while the other is decreasing).

These two position signals are then output to differential circuit 210, which compares the two signals to output a difference signal. The differential circuit 210 may comprise one or more of, a differential op-amp circuit such as a subtracter or an adder circuit (configured to add a negative signal to a positive signal), or other analog circuit known in the art.

The differential circuit 210 is configured to output a difference signal to processor 212. Processor 212 receives the difference signal and determine the position of the object 204. The processor 212 is configured to control the drive signal to the actuator 202 to modify and improve the haptic effect. For example, the processor 212 may modify one or more of the voltage, current, frequency, duty cycle, or phase of the drive signal based on the detected position of the object 204. These modifications may be configured to accelerate or decelerate the movement of the object 204 to provide the desired haptic effect with less unintended effects caused by slower acceleration/deceleration of the actuator 202.

Figure 3A:
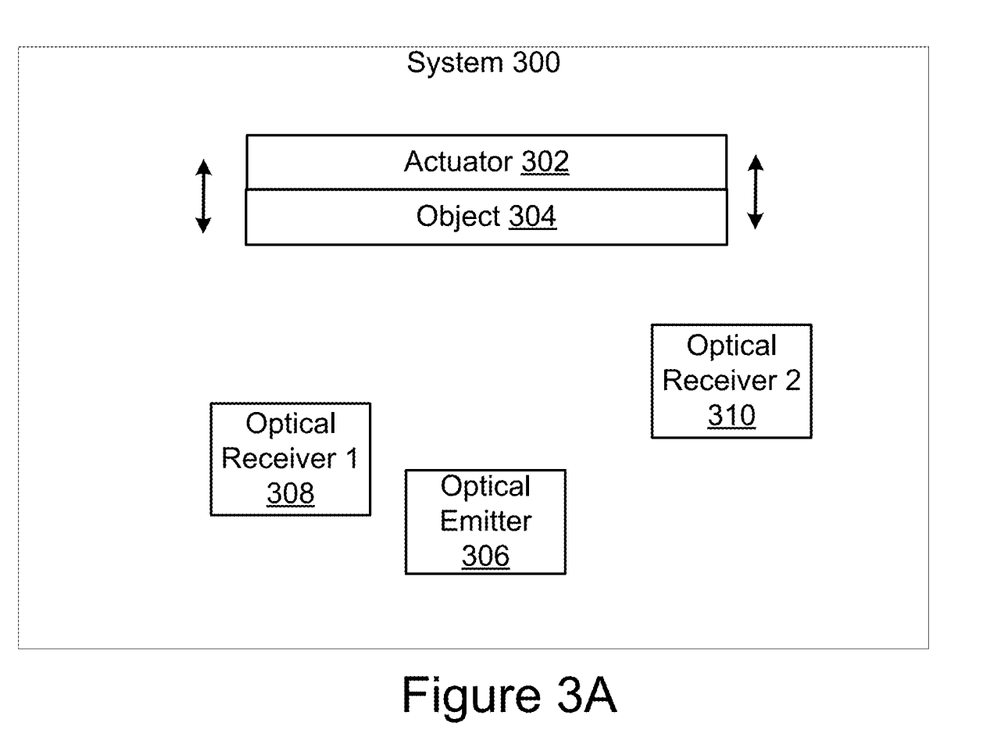
FIG. 3A shows another illustrative system for a differential optical position sensing for a haptic actuator according to one embodiment.

Turning now to FIG. 3A, which shows an illustrative system 300 for a differential optical position sensing for a haptic actuator according to one embodiment. The system 300 comprises an actuator 302 and object 304 (similar to actuator 202 and object 204 described above). As shown in FIG. 3A, the actuator 302 is configured to move the object 304 in the Y-plane.

The system 300 further comprises an emitter 306 and two receivers 308, 310. The embodiment shown in system 300 enables two optical receivers 306 to detect the position of object 304 using only one optical emitter 306. As shown in FIG. 3A, the optical emitter comprises an optic source, e.g., a Light Emitting Diode (LED), infrared source, laser, laser LED, or some other type of light source known in the art. The optical receivers 308, 310 each comprise receivers configured to receive light reflected from object 304 and transmit signals associated with the reflected light.

As is shown in FIG. 3A, the optical receiver 1 (308) is positioned relatively further from object 304 and relatively closer to optical emitter 306. Similarly, the optical receiver 2 (310) is positioned relatively closer to the object and relatively further from the optical emitter 306. In one embodiment, due to this positioning when object 304 moves toward the receivers 308 and 310, the cone of reflected light that falls on optical receiver 1 (310) increases, while the cone of reflected light that falls on optical receiver 2 (308) decreases. Similarly, when object 304 moves away, the cone of reflected light that falls on optical receiver 2 (310) increases, while the cone of reflected light that falls on optical receiver 1 (308) decreases. In another embodiment, when the moving object 304 approaches the two receivers receiver 1 (308) will output a higher intensity signal and receiver 2 (310) will output a lower intensity signal. In such an embodiment, when the moving object 304 moves away from the sensors then receiver 1 (308) will output a lower intensity signal and receiver 2 (310) will output a higher intensity signal.

In the embodiment shown in FIG. 3A, the two optical receivers are able to accurately detect the position of object 304, while using only one optical emitter 306, thus reducing the cost, complexity, and energy use of the design. The embodiment shown in FIG. 3A is an example, different configurations and positioning are possible.

Figure 3B:
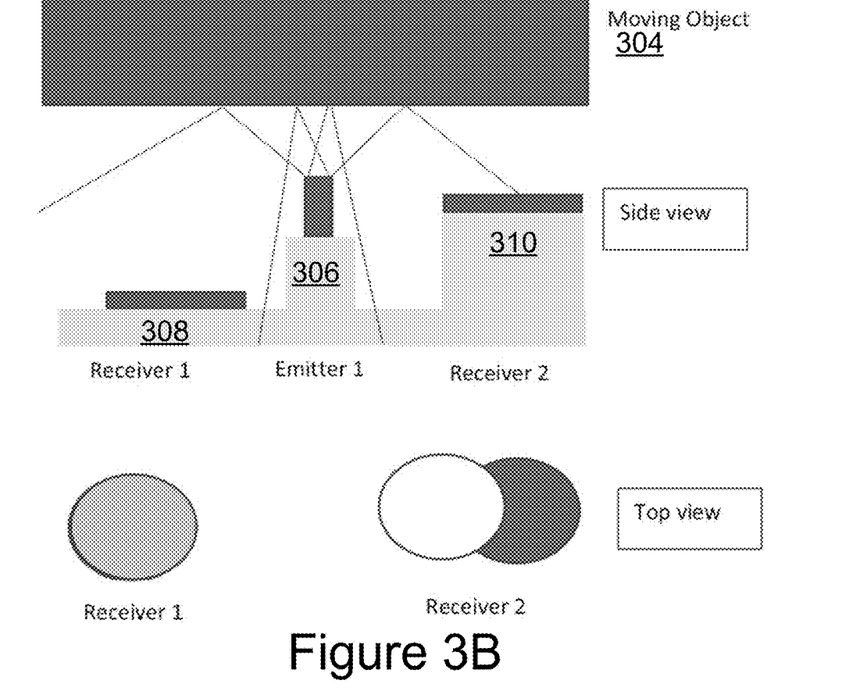
FIG. 3B shows another illustrative system for a differential optical position sensing for a haptic actuator according to one embodiment.

Turning now to FIG. 3B, which shows another illustrative system for differential optical position sensing for a haptic actuator according to one embodiment. FIG. 3B comprises a side view showing two receivers (receiver 1 (308) and receiver 2 (310)), a moving object (304), and an emitter (emitter 1 (306)). Emitter 1 (306) comprises a light source, e.g., a narrow light source such as an LED, infrared source, laser, laser LED, or some other type of light source known in the art. The two receivers (308, 310) comprise receivers configured to detect light generated by emitter 1 (306) and reflected off of the moving object (304). The reflected light is referred to herein as a "cone" of light and each receiver (308, 310) receives a separate cone of reflected light.

In the embodiment shown in FIG. 3B, the receiver 1 (308) and receiver 2 (310) are each positioned at different distances in the X-plane from the emitter 1 (306) and different distances in the Y-plane from the moving object. The positioning of the two receivers (308, 310) is such that as the moving object (304) moves, the reflected light cone will increase in intensity on one of the receivers (308, 310) (due to the shortened light path) and decrease in overlapping area on the other receiver. Alternatively when the object (304) moves in the other direction the reflected light cone will decrease in intensity on one of the receivers (308, 310) (due to the longer light path) and increase in overlapping area on the other receiver. In this fashion a differential signal is derived from receiver 1 (308) and receiver 2 (310) when the object (304) is moving throughout its sensed work space.

The top view in FIG. 3B, shows the location of the cone of light with respect to the receiver 1 (308) and receiver 2 (310). As shown in FIG. 3B, the light cone is substantially overtop of receiver 1 (308). Further, receiver 1 (308) is configured to output a signal that is proportional to the path that the light cone travels. Thus, the closer that the moving object (304) moves toward receiver 1 (308), the greater the intensity the signal that will be generated by receiver 1 (308). And as the moving object moves away from receiver 1 (308), the intensity of the signal generated by receiver 1 (306) will go down.

Similarly, as shown in FIG. 3B, the cone of light reflected from the moving object (304) is partially overlapping with sensor 2. Receiver 2 (310) is configured to output a signal that is proportional to the amount of overlap between the cone of reflected light and receiver 2 (310). Thus, as there is greater overlap between the light cone and receiver 2 (310) the strength of signal output by receiver 2 (310) will go up, and as the amount of overlap goes down the strength of signal output by receiver 2 (310) will go down. Further, in some embodiments, the geometry of the position of the receivers (308, 310) and the emitter (306) this results in the light cone and the receiver area having less overlap when the object moves closer to the sensor, and thus a lower intensity signal. In such an embodiment there will be more overlap when the moving object moves away from receiver 2 (310), and thus there will be a higher intensity signal output by receiver 2 (310).

Figure 3C:
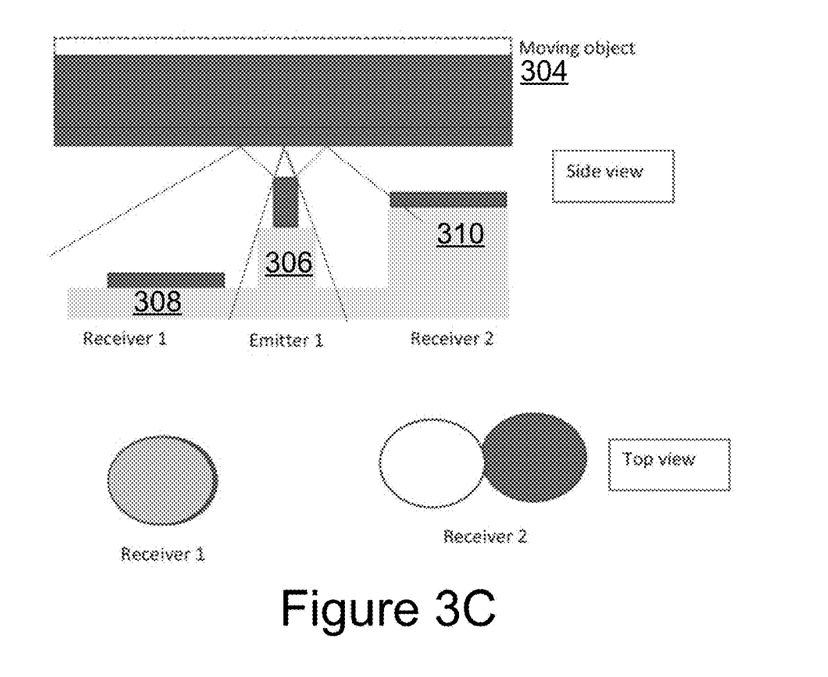
FIG. 3C shows another illustrative system for a differential optical position sensing for a haptic actuator according to one embodiment.

Turning now to FIG. 3C, which shows another illustrative system for differential optical position sensing for a haptic actuator according to one embodiment. The side view in FIG. 3C shows the same embodiment as FIG. 3B, but the moving object (304) has moved closer to the receivers (308, 310) and emitter (306), as is shown by the dotted line illustrating the prior location of the moving object. As is shown in FIG. 3C, receiver 1 (308) will output a higher intensity signal because the moving object is now closer to receiver 1 (308). Similarly, receiver 2 (310) will output a lower intensity signal because there is less overlap between the cone of reflected light and the area of receiver 2 (310).

Signals associated with the cone of light falling on each receiver (308, 310) may be used by the processor to determine data associated with the movement of the moving object (304). For example, signals received from receiver 1 (308) and receiver 2 (310) may be used by a differential circuit as described above with regard to FIG. 2 to output a difference signal. The processor may use this difference signal to determine one or more of the absolute position, relative position, speed of movement, or acceleration of the moving object.

Figure 4:
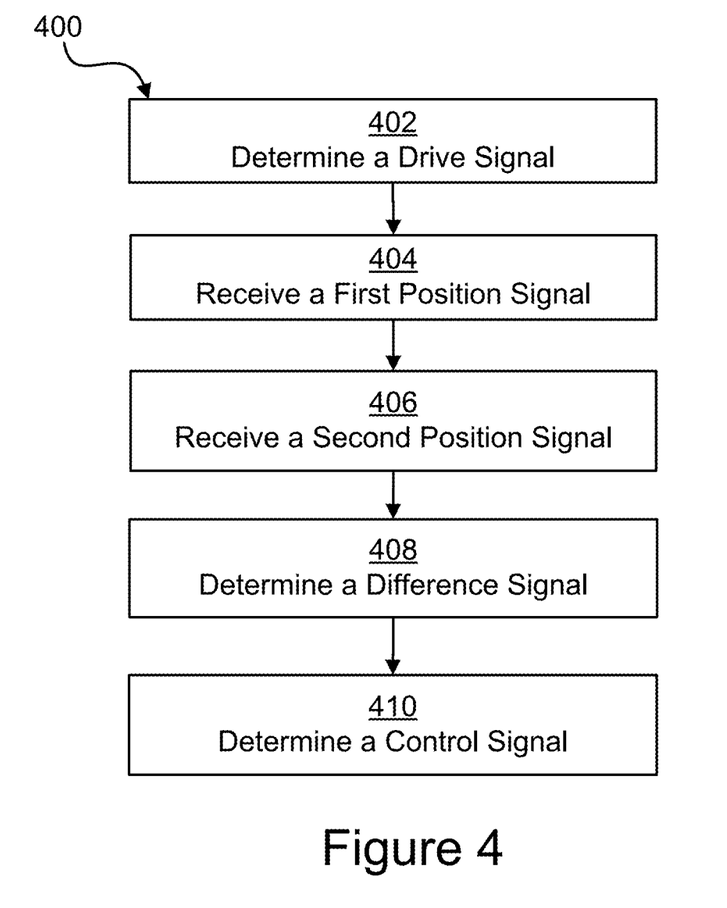
FIG. 4 is a flow chart for operation of differential optical position sensing for a haptic actuator according to one embodiment.

Illustrative Method for Differential Optical Position Sensing for a Haptic Actuator FIG. 4 is a flow chart for operation of differential optical position sensing for a haptic actuator according to one embodiment. In some embodiments, the steps may be implemented in program code executed by a processor, for example, the processor in a general purpose computer, mobile device, or server. In some embodiments, these steps may be implemented by a group of processors. In some embodiments the steps may be performed in a different order. Alternatively, in some embodiments, one or more of the steps may be skipped, or additional steps not shown may be performed. The steps below are described with reference to components described above with regard to system 200 shown in FIG. 2.

The method 400 begins at step 402 when processor 212 determines a drive signal. The processor determines a drive signal to output a desired haptic effect. The processor 212 outputs the drive signal to actuator 202, which receives the drive signal and moves object 204 to output the haptic effect.

At step 404 the differential circuit 210 receives a first position signal from sensor 1 (206). The sensor 1 (206) comprises a sensor configured to measure the position of the object 204 and output a first sensor signal to differential circuit 210.

At step 406 the differential circuit 210 receives a second position signal from sensor 2 (208). The sensor 2 (208) comprises a sensor configured to measure the position of the object 204 and output a second sensor signal to differential circuit 210. The second sensor signal is different from the first sensor signal (e.g., the second sensor signal is inverted, 180 degrees out of phase from the first position signal, and/or one position signal is increasing while the other is decreasing).

At step 408 the differential circuit determines a difference signal. The difference signal comprises a difference between the first sensor signal and the second sensor signal. Because the first sensor signal and the second sensor signal are inverted, the differential circuit will cancel any ambient noise received by the two sensors.

At step 410 the processor 212 determines a control signal. The processor 212 may determine the position of the object 204 and use this information to control the actuator 202. For example, the processor may modify the acceleration or deceleration of the actuator 202 to provide a crisper haptic effect. In some embodiments, the processor 212 may be configured to modify one or more of the voltage, current, frequency, duty cycle, or phase of the drive signal output to the haptic output device 118 based on the detected position of the object to improve the haptic effect.

Advantages of Differential Optical Position Sensing for a Haptic Actuator

There are numerous advantages of differential optical position sensing for a haptic actuator. Embodiments disclosed herein may provide for "crisper" haptic effects by allowing for faster acceleration and deceleration of actuators. This functionality may allow for lower cost hardware components to provide higher resolution haptic effects, increasing user satisfaction while decreasing cost. Further, embodiments disclosed herein may perform position sensing using only a single source (e.g., a single light source), thus further reducing cost without impacting the accuracy of measurements.

General Considerations

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process that is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

Embodiments in accordance with aspects of the present subject matter can be implemented in digital or analog electronic circuitry, in computer hardware, firmware, software, or in combinations of the preceding. In one embodiment, a computer may comprise a processor or processors. The processor comprises or has access to a computer-readable medium, such as a random access memory (RAM) coupled to the processor. The processor executes computer-executable program instructions stored in memory, such as executing one or more computer programs including a sensor sampling routine, selection routines, and other routines to perform the methods described above.

Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example tangible computer-readable media, that may store instructions that, when executed by the processor, can cause the processor to perform the steps described herein as carried out, or assisted, by a processor. Embodiments of computer-readable media may comprise, but are not limited to, all electronic, optical, magnetic, or other storage devices capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may include computer-readable media, such as a router, private or public network, or other transmission device. The processor, and the processing, described may be in one or more structures, and may be dispersed through one or more structures. The processor may comprise code for carrying out one or more of the methods (or parts of methods) described herein.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A system comprising:
   an actuator configured to receive a drive signal and move an object to output a haptic effect;
   a first sensor configured to monitor a position of the object and output a first position signal;
   a second sensor configured to monitor the position of the object and output a second position signal different from the first position signal;
   a circuit configured to receive the first position signal and the second position signal and output a difference signal; and
   a processor configured to receive the difference signal and output a control signal to the actuator based on the difference signal.

2. The system of claim 1, wherein the processor is further configured to determine the drive signal based in part on a desired haptic effect.

3. The system of claim 2, wherein the control signal comprises a modification to the drive signal.

4. The system of claim 3, wherein the control signal comprises one of: a signal configured to slow the actuator or a signal configured to cause the actuator to accelerate.

5. The system of claim 4, wherein the control signal comprises a signal 180 degrees out of phase from the drive signal.

6. The system of claim 1, wherein the first sensor and the second sensor comprise optical sensors.

7. The system of claim 6, wherein the first sensor and the second sensor are associated with a single light source.

8. The system of claim 7, wherein the first sensor and the second sensor are positioned on the same side of the object.

9. The system of claim 8, wherein the first sensor and the second sensor are positioned at different distances from the object.

10. The system of claim 9, wherein the first sensor and the second sensor are positioned such that when the object moves closer to the first sensor and the second sensor a first cone of reflected light falling on the first sensor increases in intensity and a second cone of reflected light falling on the second sensor decreases in intensity.

11. A method comprising:
  outputting a drive signal to an actuator coupled to an object and configured to move the object to output a haptic effect;
  receiving a first position signal from a first sensor configured to monitor a position of the object;
  receiving a second position signal from a second sensor configured to monitor the position of the object the second position signal different from the first position signal;
  outputting a difference signal; and
  outputting a control signal to the actuator based on the difference signal.

12. The method of claim 11, further comprising determining the drive signal based in part on a desired haptic effect.

13. The method of claim 12, wherein the control signal comprises a modification to the drive signal.

14. The method of claim 13, wherein the control signal comprises one of: a signal configured to slow the actuator or a signal configured to cause the actuator to accelerate.

15. The method of claim 14, wherein the control signal comprises a signal 180 degrees out of phase from the drive signal.

16. The method of claim 11, wherein the first sensor and the second sensor comprise optical sensors.

17. The method of claim 16, wherein the first sensor and the second sensor are associated with a single light source.

18. The method of claim 17, wherein the first sensor and the second sensor are positioned at different distances from the object.

19. The method of claim 18, wherein the first sensor and the second sensor are positioned such that when the object moves closer to the first sensor and the second sensor a first cone of reflected light falling on the first sensor increases in intensity and a second cone of reflected light falling on the second sensor decreases in intensity.

20. A non-transitory computer readable medium comprising program code, which when executed by a processor is configured to cause the processor to:
  output a drive signal to an actuator coupled to an object and configured to move the object to output a haptic effect;
  receive a difference signal from a difference circuit configured to:
  receive a first position signal from a first sensor configured to monitor the position of the object;
  receive a second position signal from a second sensor configured to monitor the position of the object, the second position signal different from the first position signal; and
  output a control signal to the actuator based on the difference signal.

* * * * *